United States Patent [19]

Engardio et al.

[11] Patent Number: 5,886,764
[45] Date of Patent: *Mar. 23, 1999

[54] POLYESTER RESIN-BASED HIGH INDEX OPHTHALMIC LENSES HAVING IMPROVED OPTICAL UNIFORMITY AND/ OR TINTABILITY

[75] Inventors: Thomas J. Engardio, Vista; Philip D. Dalsin, Carlsbad; Dae Ki Kang, Escondido; Jean S. Lee, Torrance, all of Calif.

[73] Assignee: Signet Armorlite, Inc., San Marcos, Calif.

[*] Notice: The term of this patent shall not extend beyond the expiration date of Pat. No. 5,694,195.

[21] Appl. No.: 874,189

[22] Filed: Jun. 13, 1997

(Under 37 CFR 1.47)

Related U.S. Application Data

[63] Continuation of Ser. No. 315,598, Sep. 30, 1994, Pat. No. 5,694,195.

[51] Int. Cl.$^6$ ..................................................... G02C 7/02
[52] U.S. Cl. ............................ 351/177; 351/159; 264/1.1; 264/1.32; 523/105; 523/307; 523/510; 523/518; 525/49
[58] Field of Search ............................ 264/1.32; 351/159, 351/177; 523/105, 507, 510, 518; 525/49

[56] References Cited

U.S. PATENT DOCUMENTS

| | | | |
|---|---|---|---|
| 2,884,398 | 4/1959 | Thomas et al. | 260/29.8 |
| 3,391,224 | 7/1968 | Sherr et al. | 260/872 |
| 3,513,224 | 5/1970 | Sherr | 260/872 |
| 3,513,225 | 5/1970 | Sherr | 260/872 |
| 3,806,079 | 4/1974 | Beattie | 249/126 |
| 4,139,578 | 2/1979 | Baughman et al. | 260/871 |
| 4,178,327 | 12/1979 | Hall et al. | 525/169 |
| 4,257,988 | 3/1981 | Matos et al. | 264/1.1 |
| 4,507,432 | 3/1985 | Banno et al. | 525/21 |
| 4,522,993 | 6/1985 | Sasagawa et al. | 526/292.4 |
| 4,611,892 | 9/1986 | Kawashima et al. | 351/159 |
| 4,622,382 | 11/1986 | Fischer et al. | 528/295.3 |
| 4,632,969 | 12/1986 | Sasagawa et al. | 526/286 |
| 4,650,845 | 3/1987 | Hegel | 526/261 |
| 4,689,387 | 8/1987 | Kasjimoto et al. | 528/261 |
| 4,721,377 | 1/1988 | Fukuda et al. | 351/159 |
| 4,740,070 | 4/1988 | Vance | 351/163 |
| 4,785,064 | 11/1988 | Hegel | 526/261 |
| 4,973,640 | 11/1990 | Matsuda et al. | 526/323.1 |
| 5,077,326 | 12/1991 | Shibata et al. | 523/523 |
| 5,132,384 | 7/1992 | Matsuda et al. | 526/321 |
| 5,202,366 | 4/1993 | Reid et al. | 523/516 |
| 5,254,643 | 10/1993 | Takiyama et al. | 525/445 |
| 5,319,007 | 6/1994 | Bright | 523/516 |

FOREIGN PATENT DOCUMENTS

| | | |
|---|---|---|
| A 0 376 662 | 7/1990 | European Pat. Off. . |
| 0 453 149 A2 | 10/1991 | European Pat. Off. . |
| WO 90/05061 | 5/1990 | WIPO . |

OTHER PUBLICATIONS

Database WPI—Derwent Publications Ltd., London, GB;AN 94–080018 & JP, A, 06 032 846 (Nippon Oils & Fats Co. Ltd.), 08 Feb. 1994—see abstract.

Database WPI—Derewnt Publications Ltd., London, GB; AN 91–032018 & JP, A, 02 300 221 (Nippon Oils & Fats Co. Ltd). 12 Dec. 1990—see abstract.

Boenig, Herman V., "Unsaturated Polyesters:Structure And Properties", Elsevier Publishing Company, 1964, pp. 38–54.

*Primary Examiner*—Patricia A. Short
*Attorney, Agent, or Firm*—Marshall, O'Toole, Gerstein, Murray & Borun

[57] ABSTRACT

Unsaturated polyester resin-based compositions that are modified for unexpected improvement in uniform, low optical distortion and/or improved tint speed by the addition of one or more additives selected from an allylic ester and/or an acrylic monomer, together with an exotherm depressant, making the modified polyester resin-based composition commercially viable for casting ophthalmic lenses. The additive(s) and exotherm depressant are useful to modify the polyester for sufficient enhancement of optical distortion and/or tint speed such that any unsaturated polyester resin, capable of producing a clear, low color casting, will be improved sufficiently to provide a composition having the required properties for an ophthalmic lens.

33 Claims, No Drawings

POLYESTER RESIN-BASED HIGH INDEX OPHTHALMIC LENSES HAVING IMPROVED OPTICAL UNIFORMITY AND/ OR TINTABILITY

CROSS-REFERENCE TO RELATED APPLICATION

This application is a continuation of U.S. application Ser. No. 08/315,598 filed Sep. 30, 1994, now U.S. Pat. No. 5,694,195.

FIELD OF THE INVENTION

The present invention is directed to polyester resin-based compositions and methods of manufacturing and using cured, polymeric articles, and coatings therefrom. The compositions and methods are especially useful in the manufacture of ophthalmic lenses. More particularly, the present invention is directed to unsaturated polyester-based polymeric articles, particularly unsaturated polyester-based ophthalmic lenses, that have improved optical uniformity (or lower optical distortion) and increased tint speed, while maintaining "water-white" color over time. The lenses are characterized by a relatively high index of refraction (at least about 1.5 and preferably at least about 1.56) and relatively low density, particularly below about 1.3 grams/cc, e.g., 1.24 grams/cc.

BACKGROUND OF THE INVENTION AND PRIOR ART

Plastic materials have been used for the manufacture of ophthalmic lenses for many years. Plastics offer advantages to the patient over glass, most noticeably in their lower densities, allowing for a lighter lens, and greater impact strength. Conversely, plastic lenses can exhibit disadvantages: they tend to scratch more easily, have higher levels of chromatic aberration (lower ABBE values), and may distort at higher temperature processing conditions, due to lower glass transition (Tg) temperatures, resulting in "warped" lenses, or lenses with high levels of optical distortion. Additionally, plastic lenses usually have lower index of refraction values when compared to glass, which tends to require lenses of increased thickness and reduced cosmetic appeal. The standard "CR-39" type lens, made from diethylene glycol bis(allyl carbonate), has an index of refraction of 1.498.

Advances in technology have allowed improvements in plastic lens performance. Coatings have been developed which impart improved scratch resistance. Some plastics have relatively high ABBE values which are adequate for minimizing the effects of chromatic aberration. Improvements in machining and optical lens processing equipment and processes have permitted the use of materials having lower glass transition temperatures. Plastics with higher indices of refraction, and physical lens design improvements, have helped improve the cosmetic appeal of plastic lenses.

While these improvements have helped the plastic lens gain acceptance in the marketplace, to a point where plastic lenses constitute a majority of lens eyewear in the U.S., increasing expectations for performance have dictated that good ophthalmic lenses have the following characteristics:

Clarity and Color

Lenses which are "hazy" are obviously unacceptable to the patient. Color is also of concern both from the standpoint of having a "water-white" quality for best cosmetic appeal when the lens is first purchased, as well as maintenance of that color over time, e.g., being resistant to the effects of sun light, which over time can cause the lens to turn yellow.

Optical Distortion

Lack of optical distortion requires a material having a relatively high ABBE number such that chromatic aberration is minimized; and, more importantly, a material having excellent uniformity in composition such that the occurrence of visible "waves" is minimized.

Rapidly Tintability

Many ophthalmic lenses are manufactured in semi-finished form and shipped to optical laboratories where the prescription is "ground in". With ever increasing emphasis on short optical lab turn-around times, e.g., 1 hour service, the ability of the lens material to rapidly accept fashion tints is important. In the case of semi-finished lens products, the front surface of the lens may have a scratch resistant coating which does not accept tint. Thus, the only route for tinting to occur may be the parent lens material on the back surface. This material must be tintable.

High Index of Refraction and Low Density

The higher the index of refraction, the thinner the finished lens will be for a given design. This higher index, especially when combined with a relatively low density, will allow for the manufacture of "thinner and lighter" lens products.

Over the past several years, plastic ophthalmic lenses have been fabricated from a variety of materials including polycarbonate and polymethylmethacrylate, as well as polymerized allylic compounds, epoxies, and urethanes. The most common plastic ophthalmic lens, however, is made from diethylene glycol bis(allyl carbonate) often referred to as "CR-39" (a specific product manufactured by PPG Industries). As previously mentioned, this material has a refractive index of 1.498. It is easily processed in optical laboratories, is able to be manufactured with low optical distortion and is readily tinted by various commercially available tinting dyes.

The use of polyester materials to produce ophthalmic lenses has been previously disclosed in various U.S. patents. Examples of such disclosures are U.S. Pat. Nos. 3,391,224 and 3,513,224. U.S. Pat. No. 3,391,224 discloses a composition in which a polyester is combined with from 5 to 20 weight percent methyl methacrylate and less than 5 weight percent styrene to produce a thermosetting product which can be used to produce an ophthalmic lens. U.S. Pat. No. 3,513,224 discloses a composition in which 70 to 75 weight percent of a specific unsaturated polyester formed from the reaction of fumaric acid with triethylene glycol and 2,2-dimethyl-1,3-propanediol (otherwise known as neopentyl glycol) is combined with about 12 to 18 weight percent styrene and 8 to 12 weight percent ethylene glycol dimethacrylate. The styrene raises the index of refraction to approximately 1.52, and the ethylene glycol dimethacrylate reduces brittleness of the polymer.

A number of commercially available unsaturated polyester resins has been developed which are clear when cast and have a refractive index of approximately 1.56 (the high index being primarily attributable to the use of styrene as a cross-linking diluent monomer at a level of approximately 30 to 45 weight percent). The densities of the various polyester systems are also quite low (on the order of 1.25 grams/cc). These properties are superior to CR-39 (index of 1.498 and density of 1.32 grams/cc) with regard to the potential to make "thinner and lighter" lenses.

Polymerization of the polyester resin system can be carried out in a number of ways. Quite common is the use of a system promoted with a material such as cobalt octoate or cobalt naphthenate. When used with methyl ethyl ketone peroxide, the system can be cured near room temperature. Other free radical polymerization techniques also can be used, including thermal curing using peroxides or diazo compounds, as well as photoinitiated curing using compounds selected from the following classes of photoinitiators: benzoin ethers, benzophenones, thioxanthones, ketals, acetophenones, and phosphine oxides.

Polyester resins can be manufactured using different compositions to achieve a wide variety of physical properties (hard, soft, rigid, flexible, and the like). Typical commercial polyesters include those made from a variety of glycols and acids. Common glycols used in alkyd polyester synthesis include: ethylene glycol, diethylene glycol, propylene glycol, dipropylene glycol, neopentyl glycol, and the like. Common acids used include: phthalic anhydride, isophthalic acid, adipic acid, and the like, used in conjunction with maleic anhydride and/or fumaric acid to provide unsaturation for cross-linking, usually with styrene or other diluent monomers.

Resins made using phthalic anhydride are commonly called "ortho resins"; those made with isophthalic acid are commonly referred to as "iso resins". With respect to properties desirable for making ophthalmic lenses, typical iso resins which have good scratch resistance are generally quite slow to tint. Typical ortho resins, on the other hand, are generally more scratch-prone, but tint more readily. All of the unsaturated polyester resins have a propensity to polymerize somewhat non-uniformly causing internal optical distortion or visible "waves".

As previously mentioned, styrene is commonly used as a cross-linking diluent monomer with unsaturated polyester compositions. As the portion of styrene is increased, the index of refraction also increases. However, the presence of higher concentrations of styrene also tends to cause a higher degree of exotherm within the polymerizing composition leading to the formation of optical distortion within the lens. Improving optical uniformity (lowering optical distortion) and increasing tint speed in an unsaturated polyester resin-based ophthalmic lens composition, while maintaining a high index of refraction and color, therefore, is a formidable task.

SUMMARY OF THE INVENTION

In brief, the present invention is directed to unsaturated polyester resin-based compositions that are modified for unexpected improvement in uniform, low optical distortion and/or improved tint speed by the addition of one or more additives selected from a monomeric allylic ester and/or an acrylate monomer or oligomer (weight average molecular weight below about 1,000), together with an exotherm depressant, making the modified polyester resin-based composition commercially viable for casting ophthalmic lenses. The additive(s) and exotherm depressant are useful to modify the polyester for sufficient improvement in reducing optical distortion and/or improving tint speed such that any unsaturated polyester resin capable of producing a relatively clear or colorless casting will be improved sufficiently to provide a composition having the required properties for an ophthalmic lens. Sometimes the additive will need to include a color enhancing dye to arrive at optimum lens color.

Accordingly, one aspect of the present invention is to provide unsaturated polyester resin-based compositions, including an exotherm depressant, such as alpha-methyl styrene, and an additive selected from an allylic ester, an acrylate monomer, and mixtures thereof, having improved optical uniformity and/or increased tinting speed.

Another aspect of the present invention is to provide a method of manufacturing ophthalmic lenses by polymerizing and curing a polyester resin-based composition within a mold cavity, said composition containing an exotherm depressant and an additive selected from an allylic ester, an acrylate monomer, and mixtures thereof, whereby the curing cycle temperatures are increased in essentially uniform steps, between about 80° F. and about 200° F., preferably between about 95° F. and about 190° F. over a period of time of at least about 7 hours to about 20 hours, more preferably about 12 hours to about 18 hours. After completion of this curing cycle, the lenses exhibit excellent optical uniformity.

Another aspect of the present invention is to provide a method of manufacturing ophthalmic lenses by polymerizing and curing a polyester resin-based composition within a curved mold cavity, wherein the composition includes an exotherm depressant to slow the rate of polymerization, and at least two thermal polymerization initiators. One initiator, e.g., di-(4-tert-butylcyclohexyl) peroxydicarbonate, is effective to initiate polymerization over a lower, polymerization temperature range, e.g., from about 95° F. to about 150° F.; a second thermal initiator, e.g., tert-butyl peroxy-2-ethyl hexanoate, is effective to initiate polymerization over an upper portion of the polymerization and curing temperature range, e.g., from about 150° F. to about 190° F.

The above and other aspects and advantages of the present invention will become more apparent from the following detailed description of the preferred embodiments of the present invention.

DETAILED DESCRIPTION OF THE PREFERRED EMBODIMENTS

The compositions of the present invention include an unsaturated polyester resin as a predominant portion of the composition (more than 50% by weight, preferably more than about 70% by weight, e.g., about 70% to about 85% by weight of the composition). Unsaturated polyesters are well known and can be manufactured by the reaction of one or more polyols with one or more polycarboxylic acids, with olefinic unsaturation being provided by one or more of the reactants, usually the acid. The resultant unsaturation in the polyester enables these resins to form thermosetting, cross-linked reaction products with compounds that contain olefinic double bonds, such as styrene and/or methyl methacrylate. Commercially available unsaturated polyesters which can be used in accordance with the present invention include the reaction products of one or more saturated or unsaturated dicarboxylic acids, or their ester-forming derivatives, with a saturated or a vinyl-group-containing polyhydric alcohol.

Examples of suitable unsaturated dicarboxylic acids include maleic acid, fumaric acid, citraconic acid, itaconic acid, meconic acid, and anhydrides thereof, lower alkyl esters or acid halides thereof.

Examples of suitable saturated dicarboxylic acids include aliphatic dicarboxylic acids, such as malonic acid, succinic acid, glutaric acid, adipic acid, suberic acid, azelaic acid, pimelic acid, or sebacic acid; and aromatic dicarboxylic acids, such as orthophthalic acid, terephthalic acid, isophthalic acid, m,p-diphenyl dicarboxylic acid, and diphenic acid; and anhydrides of these acids, such as phthalic anhydride and maleic anhydride, lower alkyl esters or acid halides of these acids, and mixtures thereof.

Examples of suitable polyols include ethylene glycol, propylene glycol, butylene glycol, neopentyl glycol, diethylene glycol, dipropylene glycol, triethylene glycol, poly(ethylene glycol)s and mixtures thereof.

The base polyester resin used in the compositions and methods of the present invention should have a number average molecular weight in the range of about 1,000 to about 5,000, preferably about 1,500 to about 4,000, and should be without haze. Suitable unsaturated polyesters having such properties are well known in the art.

As examples of suitable unsaturated polyester resins, the base polyester can be a polyester formed by the reaction of propylene glycol, phthalic anhydride and maleic anhydride, such as the "S-40" unsaturated polyester disclosed in Bright U.S. Pat. No. 5,319,007. The composition disclosed in the Bright patent includes a phenoxyethyl acrylate, which is not included as an acrylate additive in accordance with the present invention. Another suitable unsaturated polyester is formed by the reaction of maleic anhydride, orthophthalic anhydride and propylene glycol, such as "Aropol L-2506-15" of Ashland Chemical Co., also disclosed in the above-identified Bright U.S. Pat. No. 5,319,007.

The preferred polyester resins useful in accordance with the present invention are shown in the following examples and are the reaction products of one or more acids or anhydrides selected from phthalic acid, isophthalic acid, maleic acid, phthalic anhydride, maleic anhydride, and particularly mixtures of two or more of such acids or anhydrides, with a polyol selected from ethylene glycol, propylene glycol, diethylene glycol, dipropylene glycol, and neopentyl glycol, preferably two or more of those glycols, having a number average molecular weight in the range of about 1,500 to about 4,000.

One of the most difficult problems encountered in attempting to formulate a polyester resin-based composition into a suitable ophthalmic lens formulation is that of providing the cast and cured composition with sufficient optical clarity, or freedom from optical distortion. In conventional procedures for the casting of plastic ophthalmic lenses, the reactants used to form the resin are introduced between spaced apart glass or metal mold surfaces and the mold sections are sealed together about their inner periphery by means of a non-reactive, resilient gasket or retainer ring. Since exothermic materials are employed, the mold outer surfaces are immersed in a cooling fluid, e.g., water, or otherwise cooled to dissipate the heat of polymerization and cross-linking from the mold cavity, and to maintain an optimum polymerization and curing temperature. During the polymerization reaction, particularly prior to gelation and cross-linking, convection currents are created in the resin, while the resin is in the liquid state, as a result of a substantial temperature differential between the polymerizing resin in the mold cavity and the coolant that surrounds the mold. These convection currents tend to freeze into the polymer as polymerization proceeds through gelation and curing, resulting in striation or visible "waves" in the cured polyester resin. Lenses that contain such visible "waves" are unacceptable due to extensive optical distortion or optical non-uniformity.

In accordance with an important feature of the present invention, it has been found that the addition of an exotherm depressant to the unsaturated polyester resin-based composition results in a sufficiently reduced rate of reaction (polymerization proceeds slower over a longer period of time) to reduce the convection currents sufficiently to prevent visible "waves" or striations. The resulting cured, unsaturated polyester-based lens material has excellent optical uniformity, with low optical distortion. Suitable exotherm depressants for the unsaturated polyester-based compositions of the present invention include, for example, alpha-methyl styrene; terpinolene; gamma-terpinene; dilauryl thiodipropionate; 4-tert-butylpyrocatechol; and mixtures thereof. The exotherm depressant should be included in the composition in an amount of at least about 0.01% by weight of the composition, up to about 20% by weight, depending on the depressant used. Alpha-methyl styrene preferably is used in an amount in the range of about 2% to about 10% by weight, more preferably about 5.5% to about 7% by weight of the composition.

In addition to the exotherm depressant, it has been found that the unsaturated polyester should include an additive selected from the group consisting of an allylic ester, an acrylate monomer, and mixtures thereof, to provide improved tint speed and/or improved optical uniformity. Any low color allylic ester and any low color acrylate monomer are suitable as the additive in accordance with the present invention.

Suitable allylic esters include monoallylic esters, diallylic esters and triallylic esters, preferably an allylic ester selected from the group consisting of diallyl phthalate; diethylene glycol bis(allyl carbonate); triallyl cyanurate; and mixtures thereof. Other suitable allylic esters include allyl acrylate; allyl benzene; triallyl isocyanurate; diallyl maleate; diallyl diglycollate; dimethallyl maleate; allyl benzoate; diallyl adipate; and mixtures thereof. The allylic ester, when incorporated as a composition additive, should be included in an amount in the range of about 1% to about 20%, based on the total weight of the polyester-based lens composition, preferably about 2% to about 10% by weight; and more preferably about 6% to about 10% by weight, with best results achieved at about 7.5% to about 9% by weight.

As shown in the following examples, improvements in optical distortion and/or speed of tinting can be achieved with either an allylic ester or an acrylate monomer, when used together with an exotherm depressant. Best results are achieved with a combination of an allylic ester and an acrylate monomer, particularly since the allylic ester also functions to increase the impact strength of the cross-linked polymer network, and the acrylate additionally functions to increase the abrasion resistance.

Suitable acrylic monomers include monoacrylates, diacrylates, triacrylates, tetraacrylates, pentaacrylates, and the higher poly-functional acrylates. The preferred acrylate monomer is selected from the group consisting of methyl methacrylate; ethylene glycol dimethacrylate; 1,6 hexanediol diacrylate; trimethylolpropane polyoxyethylene triacrylate; dipentaerythritol pentaacrylate; and mixtures thereof.

Other suitable monofunctional acrylates include alkyl and substituted alkyl acrylates and methacrylates, such as ethyl acrylate; cyclohexyl methacrylate; 2-hydroxy ethyl methacrylate; 3-hydroxypropyl acrylate; and mixtures thereof. Additional suitable monofunctional acrylates and methacrylates include any haloalkyl acrylate and methacrylate, such as alpha-bromoethyl acrylate; alpha-chloroethyl acrylate; chloromethyl methacrylate; 2-bromoethyl methacrylate; and mixtures thereof.

Aryl acrylates and methacrylates also are suitable as the composition additive, such as 2-naphthyl methacrylate; para-tolyl acrylate; and mixtures thereof. Also suitable are the haloaryl acrylates and methacrylates, such as para-chlorophenyl methacrylate; meta-bromophenyl acrylate; 2,4,6-tribromophenyl acrylate; and mixtures thereof. The benzyl acrylates and methacrylates which can be used as composition additives, in accordance with the present invention, include benzyl acrylate; benzyl methacrylate and their derivatives, such as para-chlorobenzyl methacrylate; meta-methoxybenzyl methacrylate; para-ethylbenzyl acrylate; and mixtures thereof.

Other suitable polyfunctional acrylates and methacrylates include the polyol diacrylates and dimethacrylates, such as neopentyl glycol diacrylate; polyethylene glycol (400) dimethacrylate; thiodiethylene glycol dimethacrylate; and mixtures thereof. Additional useful polyfunctional acrylates and methacrylates include the polyol polyacrylates and polymethacrylates, such as pentaerythritol triacrylate; glycerol triacrylate; trimethylolpropane triacrylate; tris(2-hydroxy ethyl) isocyanurate trimethacrylate; and the aliphatic and aromatic monofunctional and polyfunctional urethane acrylates and methacrylates; and mixtures thereof.

The acrylate monomer, when incorporated as composition additive, should be included in an amount in the range of about 1% to about 20%, based on the total weight of the polyester-based lens composition, preferably about 2% to about 10% by weight; and more preferably about 6% to about 10% by weight, with best results achieved at about 7.5% to about 9% by weight.

The resulting lens will have a relatively high index of refraction (approximately 1.56), a relatively low density (approximately 1.24 grams/cc), and an acceptable ABBE value (approximately 34 to 37). The lens will have sufficient hardness to be able to be surfaced with commonly used optical laboratory equipment. Additionally, by the addition of various ultra-violet absorbing materials (such as Cyanamid Cyasorb UV5411; Ciba Geigy Tinuvin 234; and the like) and color-correcting dye(s), the lens can be made "water white" and will not appreciably yellow during exposure to sunlight.

The following Table of Examples demonstrates how various additive compositions change the properties of lenses made with various polyester resin systems. The test methodology was to cast semifinished lenses in different configurations. One group of semifinished lenses were cast with an approximately 8 diopter front curve and a 6 diopter back curve, an edge thickness of 9–12 mm, and a diameter of 75 mm. Another set of lenses were cast with 6 diopter front and back curves, an edge thickness of 9–12 mm, and a diameter of 75 mm. For most of the formulations tested, lenses were also cast with a 4 diopter front curve and 6 diopter back curve with an edge thickness of 9–12 mm, and a diameter of 75 mm. Amounts are percent by weight.

All formulations were initiated with 0.5 wt % di-(4-tert-butylcyclohexyl) peroxydicarbonate (AKZO Perkadox 16S) and 0.71 wt % of a 50% by weight solution of tert-butyl peroxy-2-ethyl-hexanoate (AKZO Trigonox 21C50). The compositions were non-promoted and thermally cured by immersing the molds in a water bath and employing the following cycle:

| TEMPERATURE | TIME |
| --- | --- |
| 95° F. | 5 hours |
| 95° F.–180° F. | approximately linear to increase over 5 hours |
| 180° F. | 6 hours |

For resin-only systems, the initiators were dissolved in approximately 1 wt % styrene. In all other cases, the initiators were dissolved in the additive composition.

The resulting lenses from each test were evaluated for the presence of visible optical distortion ("waves"). If each of the configurations of lenses for a given test group had a majority of lenses without visible optical distortion, the rating was deemed to be "Excellent". If one configuration had half or a majority of lenses with visible distortion, but the other configuration(s) had a majority without distortion, the rating was deemed to be "Good". If two configurations had half or a majority of lenses with visible optical distortion and the third configuration had a majority without distortion, the rating was "Fair". If all configurations had a majority of lenses with visible optical distortion, the rating was deemed to be "Poor".

A lens was selected from each test group, processed to uniform thickness of approximately 1.5–2.0 mm. All lenses were tinted simultaneously in gray tinting solution (BPI Gray) for 5 minutes at approximately 200° F. Those lenses exhibiting a percent transmission of visible light after tinting of greater than or equal to 65% transmission were rated "V. Slow"; 55%–64%: "Slow"; 45%–54%: "Medium"; 35%–44%: "Fast"; less than or equal to 34% transmission were rated as "V. Fast".

Hardness was measured on lenses from each test group using a Barber Colman type 935 machine. A rating of 80 or more is deemed to be acceptable.

Examples 1 through 4 demonstrate the properties of polyester lenses made from the initiated resin. Resins A and B are ortho type resins, while resins C and D are iso resins.

Example 5 demonstrates the use of an additive composition to improve the optical clarity of resin C from a "Poor" rating to "Good". The additive comprised approximately 22 wt % of the total formulation. In this composition, the additive consisted of triallyl cyanurate (46%) combined with trimethylolpropane polyoxyethylene triacrylate (18%) and alpha-methyl styrene (36%) as the exotherm depressant.

Example 6 demonstrates the use of a different additive composition to improve the optical clarity of resin B from a "Poor" rating to "Excellent". In this example, the allyl compound is diallyl phthalate (31%), the acrylate is 1,6 hexanediol diacrylate (31%) and the exotherm depressant is alpha-methyl styrene (38%).

Examples 7 and 8 show the same additive package used in Example 6 with the two iso resins, C and D. Slight improvements were noted for both optical clarity ("Poor" improved to "Fair") and tint speed. Resin C composition changed from "V. Slow" to "slow" and resin D composition changed from "Medium" to "Fast".

Example 9 shows the effect of a different composition of additive where the allyl compound is diethylene glycol bis(allyl carbonate) (50%) blended with the alpha-methyl styrene (50%) exotherm depressant, and without an acrylate monomer. The additive was 19 wt % of the formulation. A dramatic improvement in tint speed was noted. The rating improved from "Medium" to "Very Fast".

Example 10 shows the effect on improving the tint speed of resin A of a mixture of methacrylates and an acrylate, with an alpha-methyl styrene exotherm depressant, and no allylic ester. The composition was ethylene glycol dimethacrylate (40%), dipentaerythritol pentaacrylate (23%), methyl methacrylate (27%) and alpha-methyl styrene (10%). The tint improved from a "Medium" rating to "Fast".

Example 11 demonstrates a dramatic improvement in tint rate for resin A with a mixture of diallyl phthalate (75%) and alpha-methyl styrene (25%), without an acrylate monomer, comprising 10% of the formulation total. The tint speed increased from "Medium" to "Very Fast".

Example 12 shows a good improvement in the optical clarity and tint rate of resin A by varying the composition additive of Example 11 to diallyl phthalate (25%) and alpha-methyl styrene (75%), the mixture still comprising 10% of the total formulation. The optical clarity improved from "Good" to "Excellent" and the tint improved from "Medium" to "Fast".

Example 13 demonstrates the use of ethylene glycol dimethacrylate (25%) and alpha-methyl styrene (75%) to generate the same improvement in optical clarity of resin A as shown by the mixture used in Example 12; however the tint speed is somewhat reduced.

Examples 14 through 16 show the effect of varying the additive percentage of the whole formulation. Here the additive is a mixture of diethylene glycol bis(allyl carbonate) (36%), dipentaerythritol pentaacrylate (14%), methyl methacrylate (23%) and alpha-methyl styrene (27%). At the 10% level of additive in the entire composition, no improvement is noted; however as the level is raised to 20% of the total, the tint speed increases from "Medium" to "Fast". As the composition is increased further to 50%, the tint speed increases further to "V. Fast", but reduction in optical clarity and hardness is noted.

Examples 17 through 20 show the effect of varying the percentage of a different additive composition to the whole formulation. Here the additive is a mixture of diallyl phthalate (36%), ethylene glycol dimethacrylate (14%), methyl methacrylate (23%) and alpha-methyl styrene (27%). At the 20%, 23%, and 30% additive levels, the tint speed has increased from "Medium" to "Fast" and the optical clarity has improved to "Excellent". At 50% additive, the optical clarity continues to be "Excellent" while the tint speed increases further to "V. Fast". The hardness of this composition, however, is approaching an unacceptably soft level.

TABLE OF EXAMPLES

| Ex. # | Resin Type | Additive Composition | Additive (%) | Optical Uniformity | Tint Speed | BARCOL |
|---|---|---|---|---|---|---|
| 1 | A | None | 0 | Good | Medium | 88 |
| 2 | B | None | 0 | Poor | Fast | 88 |
| 3 | C | None | 0 | Poor | V. Slow | 88 |
| 4 | D | None | 0 | Poor | Medium | 87 |
| 5 | C | TAC (46%) TMPTA (18%) AMS (36%) | 22 | Good | V. Slow | 87 |
| 6 | B | DAP (31%) HDA (31%) AMS (38%) | 24 | Excellent | Medium | 88 |
| 7 | C | DAP (31%) HDA (31%) AMS (38%) | 24 | Fair | Slow | 86 |
| 8 | D | DAP (31%) HDA (31%) AMS (38%) | 24 | Fair | Fast | 85 |
| 9 | A | ADC (50%) AMS (50%) | 19 | Good | V. Fast | 84 |
| 10 | A | EGDMA (40%) DPPA (23%) MMA (27%) AMS (10%) | 22 | Good | Fast | 89 |
| 11 | A | DAP (75%) AMS (25%) | 10 | Good | V. Fast | 88 |
| 12 | A | DAP (25%) AMS (75%) | 10 | Excellent | Fast | 89 |
| 13 | A | EGDMA (25%) AMS (75%) | 10 | Excellent | Medium | 90 |
| 14 | A | ADC (36%) DPPA (14%) MMA (23%) AMS (27%) | 10 | Poor | Medium | 88 |
| 15 | A | ADC (36%) DPPA (14%) MMA (23%) AMS (27%) | 20 | Good | Fast | 87 |
| 16 | A | ADC (36%) DPPA (14%) MMA (23%) AMS (27%) | 50 | Fair | V. Fast | 80 |
| 17 | A | DAP (36%) EGDMA (14%) MMA (23%) AMS (27%) | 20 | Excellent | Fast | 88 |
| 18 | A | DAP (36%) EGDMA (14%) MMA (23%) AMS (27%) | 23 | Excellent | Fast | 88 |
| 19 | A | DAP (36%) EGDMA (14%) MMA (23%) AMS (27%) | 30 | Excellent | Fast | 88 |
| 20 | A | DAP (36%) EGDMA (14%) | 50 | Excellent | V. Fast | 80 |

-continued

TABLE OF EXAMPLES

MMA (23%)
AMS (27%)

Table Notes:
Resin A is a clear unsaturated polyester ortho resin intermediate (Silmar D-910) formed from the reaction of phthalic anhydride, maleic anhydride, propylene glycol, ethylene glycol and diethylene glycol and has a number average molecular weight of about 2,200. Resin A contains approximately 30% by weight styrene as a diluent monomer.
Resin B is a clear unsaturated polyester ortho resin intermediate (Silmar SD1050A) formed by the reaction of phthalic anhydride, maleic anhydride, and propylene glycol, having a number average molecular weight of about 1,900. Resin B contains approximately 30% by weight styrene as a diluent monomer.
Resin C is an unsaturated polyester iso resin intermediate (Silmar SD1050D) formed by the reaction of isophthalic acid, maleic anhydride and neopentyl glycol having a number average molecular weight of about 3,100. Resin C contains approximately 30% by weight styrene as a diluent monomer.
Resin D is an unsaturated polyester iso resin intermediate (Silmar SD1050D) formed by the reaction of isophthalic acid, maleic anhydride, porpylene glycol and dipropylene glycol having a number average molecular weight of about 2,400. Resin D contains approximately 30% by weight styrene as a diluent monomer.
TAC is triallyl cyanurate.
TMPTA is trimethylolpropane polyoxyethylene triacrylate (SARTOMER CD499).
AMS is alpha-methyl styrene.
DAP is diallyl phthalate
HDA is 1,6 hexanediol diacrylate (SARTOMER SR238).
ADC is diethylene glycol bis(allyl carbonate) -- (PPG CR-39).
EGDMA is ethylene glycol dimethacrylate (SARTOMER SR206).
DPPA is dipentaerythritol pentaacrylate (SARTOMER SR399).
MMA is methyl methacrylate.

Another composition is shown in Example 21.

| INGREDIENTS | WEIGHT PERCENT |
|---|---|
| Unsaturated polyester Resin A | 79% |
| Diethylene glycol bis(allyl carbonate) | 8% |
| Dipentaerythritol pentaacrylate | 3% |
| Alpha-methyl-styrene | 5% |
| Methyl methacrylate | 5% |
| Blue dye | trace |
| UV stabilizer | trace |

The composition of Example 21 not only offers great economical advantage for manufacturing lenses of 1.56 refractive index at low material costs, but the resultant lens product also possesses good mechanical performance, good optical quality, and water-white color, all of which are describe characteristics for the ophthalmic lens market.

The viscosity of the composition is 250 centipoises at 25° C. which can be easily handled by the conventional mixing, filtering and pouring devices. Employing the heat cure cycle given below, the following physical properties of the uncoated lenses were obtained:

| Index of refraction | 1.556 |
|---|---|
| Density g/cc | 1.25 |
| FDA Drop Ball inches @ 1.55 mm center thickness | 120 |
| Yellow index @ 14 mm thickness | 1.30 |
| UV cut-off (5%), nm | 370 |

The formulation of Example 21 was initiated with 0.5 wt % Perkadox 16S and 1.0 wt % Trigonox 21C50. The preferred cure cycle for the composition is:

| TEMPERATURE | TIME |
|---|---|
| 95° F. | Hold constant for 5 hours |
| Raise to 105° F. | 1 hour |
| Raise to 120° F. | 1 hour |
| Raise to 135° F. | 1 hour |
| Raise to 150° F. | 1 hour |
| Raise to 165° F. | 1 hour |
| Raise to 180° F. | 1 hour |
| 180° F. | Hold constant for 4 hours |
| Cool to 165° F. | Approximately 3 hours |

Another excellent composition is shown in Example 22.

| INGREDIENTS | WEIGHT PERCENT |
|---|---|
| Unsaturated polyester Resin A | 78% |
| Diallyl phthalate | 8% |
| Methyl methacrylate | 5% |
| Alpha-methyl styrene | 6% |
| Ethylene glycol dimethacrylate | 3% |
| Cyasorb UV-5411 | trace |
| Tinuvin 234 | trace |
| Blue dye | trace |

The formulation of Example 22 was initiated with 0.5 wt % Perkadox 16S and 0.71 wt % Trigonox 21C50. The preferred cure cycle for the composition is:

| TEMPERATURE | TIME |
|---|---|
| 95° F. | Hold constant for 5 hours |
| Raise to 110° F. | 1 hour |
| Raise to 125° F. | 1 hour |
| Raise to 140° F. | 1 hour |
| Raise to 160° F. | 1 hour |
| Raise to 195° F. | 2 hours |

-continued

| TEMPERATURE | TIME |
| --- | --- |
| 195° F. | Hold constant for 6 hours |
| Cool to 180° F. | 1 hour |

The physical properties of the lenses made from this composition and cure cycle are:

| | |
| --- | --- |
| Index of refraction: | 1.562 |
| Density g/cc: | 1.24 |
| FDA Drop Ball inches @ 1.55 mm center thickness | 130 |
| Yellow index @ 14 mm thickness | 2.4 |
| UV cut-off (5%), nm 1.6 mm thickness | 380 |

The lenses from this composition exhibit improved optical uniformity over those from Example 21 while maintaining good mechanical performance and color.

It should be understood that the present disclosure has been made only by way of preferred embodiments and that numerous changes in details of construction, combination and arrangement of parts can be resorted to without departing from the spirit and scope of the invention as hereunder claimed.

What is claimed is:

1. A method of casting a cross-linkable casting composition into a curved ophthalmic lens having an index of refraction of at least 1.50 comprising disposing the casting composition in a mold cavity formed between adjacent, non-planar mold sides, and subjecting the composition to conditions sufficient to polymerize and cross-link the composition, said composition comprising
   35–63% by weight of an unsaturated polyester resin;
   an additive selected from the group consisting of about 1% to about 20% by weight of an allylic ester monomer; about 1% to about 20% by weight of an acrylate; and mixtures thereof; and
   an exotherm depressant selected from the group consisting of alpha-methyl styrene; terpinolene; gamma-terpinene; dilauryl thiodipropionate; 4-tert-butylpyrocatechol; 3-methyl catechol and mixtures thereof for depressing the rate of polymerization of said composition, in an amount sufficient to prevent the formation of visible waves in the cured composition.

2. A method in accordance with claim 1, wherein the additive comprises an allylic ester monomer.

3. A method in accordance with claim 2, wherein the additive comprises an allylic ester monomer selected from the group consisting of diallyl phthalate, diethylene glycol bis(allyl carbonate), triallyl cyanurate, and mixtures thereof.

4. A method in accordance with claim 1, wherein the additive comprises an acrylate monomer.

5. A method in accordance with claim 4, wherein the acrylate monomer is selected from the group consisting of methyl methacrylate; ethylene glycol dimethacrylate; 1,6 hexanediol diacrylate; trimethylolpropane polyoxyethylene triacrylate; dipentaerythritol pentaacrylate; and mixtures thereof.

6. A method in accordance with claim 1, wherein the additive comprises about 1% to about 20% by weight of an allylic ester monomer and about 1% to about 20% by weight of an acrylate monomer.

7. A method in accordance with claim 6, wherein the exotherm depressant comprises alpha-methyl styrene in an amount of about 1% to about 20% by weight of the composition.

8. A method in accordance with claim 7, wherein the allylic ester monomer, the acrylate monomer and the alpha-methyl styrene each is present in the composition in an amount of about 2% to about 10% based on the total weight of the composition.

9. A method in accordance with claim 1, further including a polymerization initiator in an amount of about 0.01 to about 10% based on the total weight of the composition.

10. A method in accordance with claim 9, wherein the polymerization initiator comprises a combination of di-(4-tert-butylcyclohexyl) peroxydicarbonate and tert-butyl peroxy-2-ethyl-hexanoate each in an amount in the range of about 0.1% to about 1% by weight of the composition.

11. A method in accordance with claim 1, wherein the composition comprises about 35% to about 63% by weight of an unsaturated polyester resin; about 6% to about 10% by weight diallyl phthalate; about 1% to about 5% by weight ethylene glycol dimethacrylate; and about 3% to about 8% by weight methyl methacrylate; and wherein the exotherm depressant is included in the composition in an amount of about 0.01% to about 9% by weight of the composition.

12. A method in accordance with claim 11, wherein the exotherm depressant comprises alpha-methyl styrene.

13. A method in accordance with claim 12 comprising about 35% to about 63% by weight of an unsaturated polyester resin; about 7.5% to about 9% by weight diallyl phthalate; about 2.5% to about 4% by weight ethylene glycol dimethacrylate; about 4.5% to about 6% by weight methyl methacrylate; and about 5.5% to about 7% by weight alpha-methyl styrene.

14. A method in accordance with claim 1, wherein the composition comprises about 35% to about 63% by weight of an unsaturated polyester resin; about 6% to about 10% by weight diethylene glycol bis(allyl carbonate); about 1% to about 5% by weight dipentaerythritol pentaacrylate; and about 3% to about 8% by weight methyl methacrylate; and wherein the exotherm depressant is included in the composition in an amount of about 0.01% to about 9% by weight of the composition.

15. A method in accordance with claim 14, wherein the exotherm depressant comprises alpha-methyl styrene.

16. A method in accordance with claim 15 comprising about 35% to about 63% by weight of an unsaturated polyester resin; about 7.5% to about 9% by weight diethylene glycol bis(allyl carbonate); about 2.5% to about 4% by weight dipentaerythritol pentaacrylate; about 4.5% to about 6% by weight methyl methacrylate; and about 5.5% to about 7% by weight alpha-methyl styrene.

17. The method of claim 1, wherein the acrylate is selected from the group consisting of an acrylate monomer; an acrylate oligomer having a weight average molecular weight less than about 1,000; and mixtures thereof.

18. A method of improving vision of an object by a human eye comprising disposing between the eye and the object a polymeric ophthalmic lens, having an index of refraction of at least 1.50, said ophthalmic lens cured from a composition comprising:
   35–63% by weight of an unsaturated polyester resin;
   an additive selected from the group consisting of about 1% to about 20% of an allylic ester monomer; about 1% to about 20% by weight of an acrylate; and mixtures thereof; and
   an exotherm depressant selected from the group consisting of alpha-methyl styrene; terpinolene; gamma-terpinene; dilauryl thiodipropionate; 4-tert-butylpyrocatechol; 3-methyl catechol and mixtures thereof for depressing the rate of polymerization of said composition, in an amount sufficient to prevent the formation of visible waves in the cured composition.

19. A method in accordance with claim 18, wherein the additive comprises an allylic ester monomer.

20. A method in accordance with claim 19, wherein the additive comprises an allylic ester monomer selected from the group consisting of a monoallyl ester, a diallyl ester, a triallyl ester, and mixtures thereof.

21. A method in accordance with claim 20, wherein the allylic ester monomer is selected from the group consisting of allyl acrylate; allylbenzene; diallyl phthalate; triallyl cyanurate; triallyl isocyanurate; diallyl maleate; diethylene glycol bis(allyl carbonate); diallyl digycollate; dimethallyl maleate; allyl benzoate; diallyl adipate; and mixtures thereof.

22. A method in accordance with claim 21, wherein the exotherm depressant is selected from the group consisting of alpha-methyl styrene; terpinolene; gamma terpinene; dilauryl thiodipropionate; 4-tert-butylpyrocatechol; 3-methyl catechol; and mixtures thereof in an amount of about 0.01% to about 20% by weight of the composition.

23. A method in accordance with claim 20, wherein the allylic ester monomer is selected from the group consisting of diallyl phthalate, diethylene glycol bis(allyl carbonate), triallyl cyanurate, and mixtures thereof.

24. A method in accordance with claim 18, wherein the additive comprises an acrylate monomer.

25. A method in accordance with claim 24, wherein the exotherm depressant comprises alpha-methyl styrene in an amount of about 1% to about 20% by weight of the composition.

26. The method of claim 24, wherein the acrylate is selected from the group consisting of an acrylate monomer; an acrylate oligomer having a weight average molecular weight less than about 1,000; and mixtures thereof.

27. A method in accordance with claim 24, wherein the acrylate additive is selected from the group consisting of methyl methacrylate; ethyl acrylate; cyclohexyl methacrylate; 2-hydroxyethyl methacrylate; 3-hydroxypropyl acrylate; alpha-bromoethyl acrylate; alpha-chloroethyl acrylate; chloromethyl methacrylate; 2-bromethyl methacrylate; 2-naphthyl methacrylate; para-tolyl acrylate; para-chlorophenyl methacrylate; meta-bromophenyl acrylate; 2,4,6-tribromophenyl acrylate; para-chlorobenzyl methacrylate; meta-methoxybenzyl methacrylate; para-ethylbenzyl acrylate; ethylene glycol dimethacrylate; 1,6 hexanediol dimethacrylate; neopentyl glycol diacrylate; polyethylene glycol dimethacrylate; thiodiethylene glycol dimethacrylate; pentaerythritol triacrylate; glyceryl triacrylate; dipentaerythritol pentaacrylate; trimethylolpropane triacrylate; tris (2-hydroxy ethyl) isocyanurate trimethacrylate; trimethylolpropane polyoxyethylene triacrylate; a urethane acrylate; a urethane methacrylate; and mixtures thereof.

28. A method in accordance with claim 18, wherein the additive comprises about 1% to about 20% by weight of an allylic ester monomer and about 1% to about 20% by weight of an acrylate monomer.

29. A method in accordance with claim 18, wherein the unsaturated polyester resin is formed by the reaction of an acid or anhydride selected from the group consisting of phthalic acid, isophthalic acid, maleic acid, phthalic anhydride, maleic anhydride, and mixtures thereof, with a polyol selected from the group consisting of ethylene glycol, propylene glycol, diethylene glycol, dipropylene glycol, neopentyl glycol, and mixtures thereof.

30. A method in accordance with claim 18, wherein the unsaturated polyester has a number average molecular weight in the range of about 1,500 to about 4,000.

31. A method of casting a cross-linkable casting composition into a curved ophthalmic lens having an index of refraction of at least 1.50 comprising disposing the casting composition in a mold cavity formed between adjacent, non-planar mold sides, and subjecting the composition to conditions sufficient to polymerize and cross-link the composition, at a temperature of about 200° F. or lower prior to gelation and cross-linking, and for at least about 7 hours, said composition comprising 35–63% by weight of an unsaturated polyester resin;

an additive selected from the group consisting of about 1% to about 20% by weight of an allylic ester monomer; about 1% to about 20% by weight of an acrylate; and mixtures thereof; and an exotherm depressant selected from the group consisting of alpha-methyl styrene; terpinolene; gamma-terpinene; dilauryl thiodipropionate; 4-tert-butylpyrocatechol; 3-methyl catechol; and mixtures thereof for depressing the rate of polymerization of said composition, in an amount sufficient to prevent the formation of visible waves in the cured composition.

32. The method of claim 31, wherein the temperature of the composition is maintained between about 80° F. and about 190° F. while the composition is in a liquid state.

33. The method of claim 31, wherein the temperature of the composition is maintained below about 180° F. while the composition is in a liquid state.

* * * * *

UNITED STATES PATENT AND TRADEMARK OFFICE
CERTIFICATE OF CORRECTION

PATENT NO. : 5,886,764
DATED : March 23, 1999
INVENTOR(S) : Engardio et al.

It is certified that error appears in the above-identified patent and that said Letters Patent is hereby corrected as shown below:

Column 11,
Line 18, in Table Notes for Resin D, "porpylene glycol" should be -- propylene glycol --.

Column 14,
Line 7, after "0.01" insert -- % --.

Signed and Sealed this

Thirtieth Day of November, 2004

JON W. DUDAS
*Director of the United States Patent and Trademark Office*